May 14, 1940.   M. BOTKIN ET AL   2,200,325

PEARL BAKING SHELL

Filed Feb. 13, 1939

Inventors,
Charles Frank Nord, Sr.
Millard Botkin

Patented May 14, 1940

2,200,325

UNITED STATES PATENT OFFICE 2,200,325

PEARL BAKING SHELL

Millard Botkin, Kansas City, and Charles Frank Nord, Sr., Louisiana, Mo.

Application February 13, 1939, Serial No. 256,232

1 Claim. (Cl. 41—10)

Our invention relates to new and useful improvements in the method and process of treating and fabricating the shells of fish, such as clam shells, mussel shells, oyster shells, or any other fish shells of similar chemical composition or physical appearance, so that they become articles (named "pearl baking shells" by us) of utility and decoration of many uses such as: Plates, dishes, bowls, and similar for the preparation of foods in the oven or for the holding of foods in their serving; decorative pieces of jewelry on dining tables and other furniture, fixtures, and so forth; ash trays and other receptacles for retaining matter; and numerous other purposes for the service and pleasure of civilization.

Figure 1:
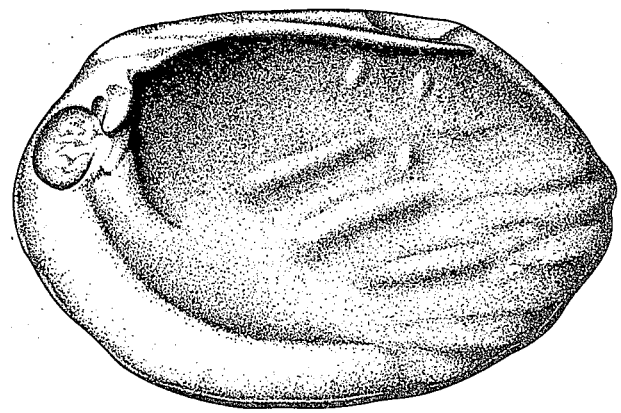
Figure 2:
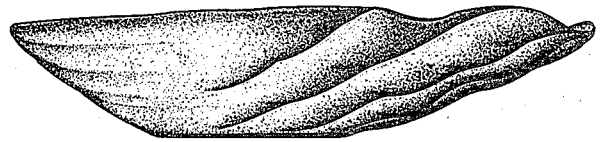

In the accompanying drawing, Figs. 1 and 2 illustrate two different views of a pearl baking shell resulting from the performance of our process.

The fish shells are preferably obtained from the pearl button shell industry. A preferred process for converting fish shells into pearl baking shells is covered in the following stages:

First, the shells are thoroughly washed and cleaned, if necessary or desirable to increase their utility and serviceability or enhance their beauty. The purpose here is to remove all dirt or foreign matter and as much bark from the backs of the shells as practicable, without harming them chemically or physically. The preferred process here is to tumble for about one hour about one gross, more or less, of shells, of any or all sizes, in a revolving cylindrical metal churn in the presence of boiling water, live steam to hold water at boiling temperature, and flake caustic soda in the proportion of approximately twelve ounces of caustic soda to six gallons of water. The shells are then thoroughly washed in cold water to remove all trace of the chemical.

Second, the shells are machined by means of an emery or grinding wheel, if necessary to increase their utility and serviceability or enhance their beauty. The primary purpose here is to form the raw shells into articles more serviceable. The preferred method here is: first, to grind back the thin edge of each shell about one-quarter of an inch so that the thickness of the edge is about one-eighth of an inch but so that the shell still retains in general the original shape; second, to grind down flat the hinge of the shell flush with the part of the shell bordering the hinge; and third, to grind a flat place on the outside or back of the shell so that it will set rigid on its back and so that the inside or front of the shell is cupped up approximately perpendicular to the flat object on which it may rest.

Third, the shells are then polished, if necessary to increase their utility and serviceability or enhance their beauty. The primary purpose here is to form the shells into smooth and highly lustrous articles, the better to withstand without chemical or physical changes any services they might render as new and useful articles for any and all users. The preferred method here is to tumble about one-third gross, more or less, of the shells for about one hour in a revolving wooden cylindrical churn in the presence of cold water and four gallons of small bits of previously polished pearl scrap into which mass sulphuric acid of 66 degree strength is caused to slowly drip constantly at the rate of about sixteen liquid ounces per hour. The shells and pearl scrap are then thoroughly washed in cold water to remove all trace of the acid and reacting substance caused by it. The shells and pearl scrap are then tumbled in the same churn for about five minutes in the presence of boiling water and live steam, to hold water at boiling temperature, into which mass muriatic acid of 18 degree strength is caused to slowly drip constantly at the rate of about four liquid ounces per five minutes. The shells and pearl scrap are then thoroughly washed in cold water to remove all trace of the acid and reacting substance caused by it. The shells are then separated from the pearl scrap by any convenient method.

Fourth, the shells are then bleached, if necessary to increase their utility and serviceability or enhance their beauty. The primary purpose here is to bleach the backs of the shells to a color as near white as practicable. The preferred method here is to place about one-third gross, more or less, of the shells in a four gallon ceramic jar, cover the shells with a liquid solution of approximately sixty-three parts of water, one part Albone "C" (100 vol. electrolytic hydrogen peroxide) and enough silicate of soda to make the bath slightly alkaline, and then place the jar and contents in a heated box or compartment that will create and maintain the solution at a temperature constantly between 100 degrees and 200 degrees Fahrenheit for a period of twenty-four to forty-eight hours until shells appear properly treated. The shells are then thoroughly washed in cold water, then in hot water, and then spread out to drain.

Fifth, the shells are then super-polished, if necessary to increase their utility and serviceability or enhance their beauty. The primary purpose here is to give the shells a true finish preparatory for sale. The preferred method here is to tumble about one-third gross, more or less, of shells for about one hour in a revolving wooden hexagonal air-tight tumbling barrel in the presence of about twelve gallons of dry clean sawdust containing two tablespoons of ordinary cleaning soap flakes. The shells are then separated from the sawdust by any convenient method, wrapped in packing paper or boxes, preferably six to a package, and are then ready for the market.

It is to be understood that the form of our invention, herewith described, is to be regarded as a preferred example of the same, and that elimination of, changes in, and/or additions to the stages of the process may be resorted to and that chemical equivalents may be employed, without departing from the spirit of our invention or the scope of the subjoined claim. We are aware that prior to our invention the before mentioned first, third, fourth and fifth stages of our process have been common practice, in similar but not exact detail, in the preparation for market of pearl buttons and other pearl products. We therefore do not claim our process broadly; but

We claim:

The process of manufacturing pearl baking shells comprising: agitating fish shells in a bath of hot water and caustic soda thereby procuring a product free from bark and foreign matter; machining each fish shell by grinding around the edge, grinding away the hinge, grinding a flat place on the back, and grinding irregularities, defects and the like; agitating the fish shells in a bath of water, pearl scrap and sulphuric acid and then in a bath of hot water, pearl scrap, and muriatic acid thereby procuring a polished product; soaking the fish shells in a bath of warm water, hydrogen peroxide, and silicate of soda thereby procuring a bleached product; agitating the fish shells in a mixture of sawdust and soap thereby procuring a buffed product.

MILLARD BOTKIN.
CHARLES FRANK NORD, Sr.